H. B. TOBIAS.
VEHICLE TIRE.
APPLICATION FILED MAY 15, 1908.
954,361.
Patented Apr. 5, 1910.
3 SHEETS—SHEET 1.
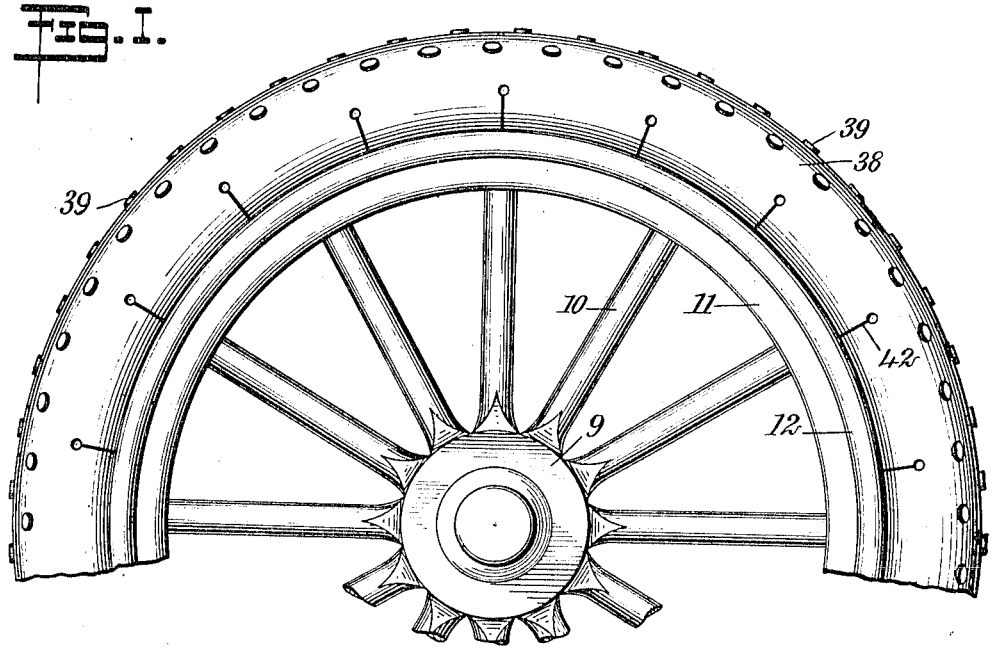
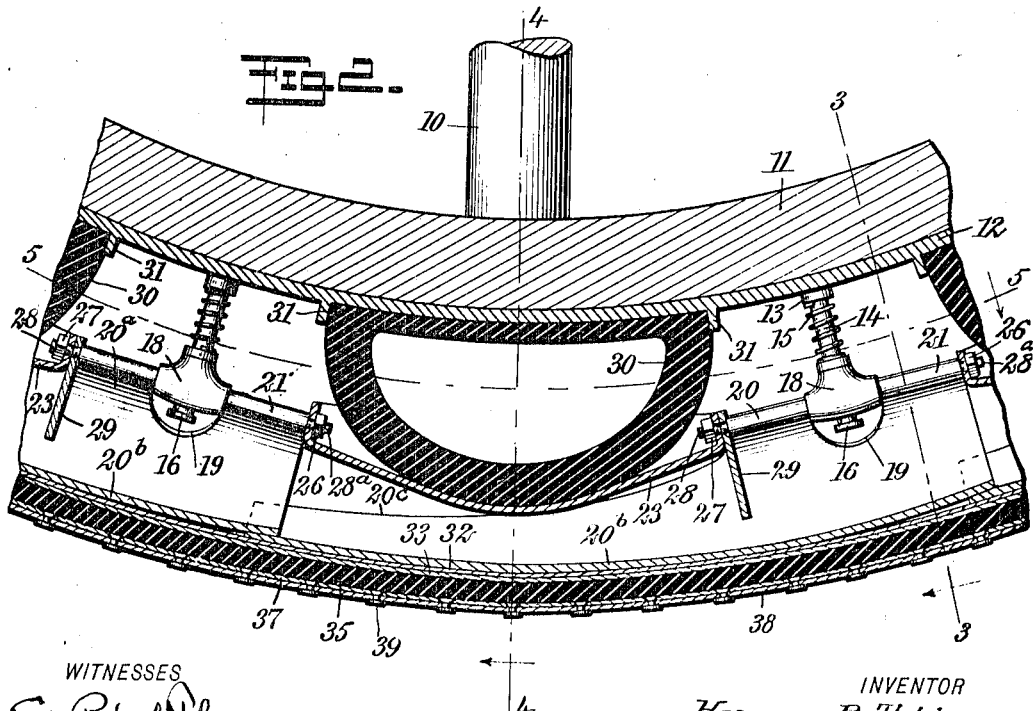
WITNESSES
G. Robert Thomas
Walton Harrison
INVENTOR
Herman B. Tobias
BY Munn & Co.
ATTORNEYS.

H. B. TOBIAS.
VEHICLE TIRE.
APPLICATION FILED MAY 15, 1908.
954,361.
Patented Apr. 5, 1910.
3 SHEETS—SHEET 2.
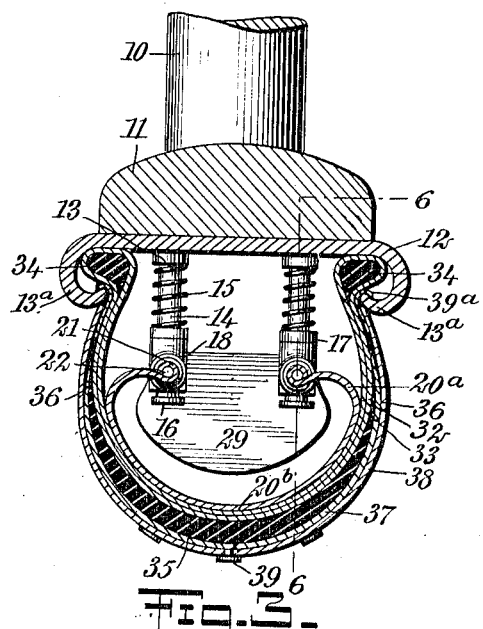
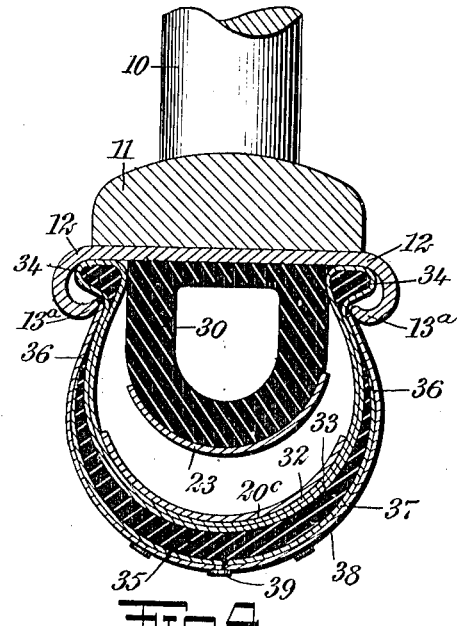
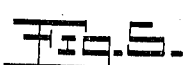
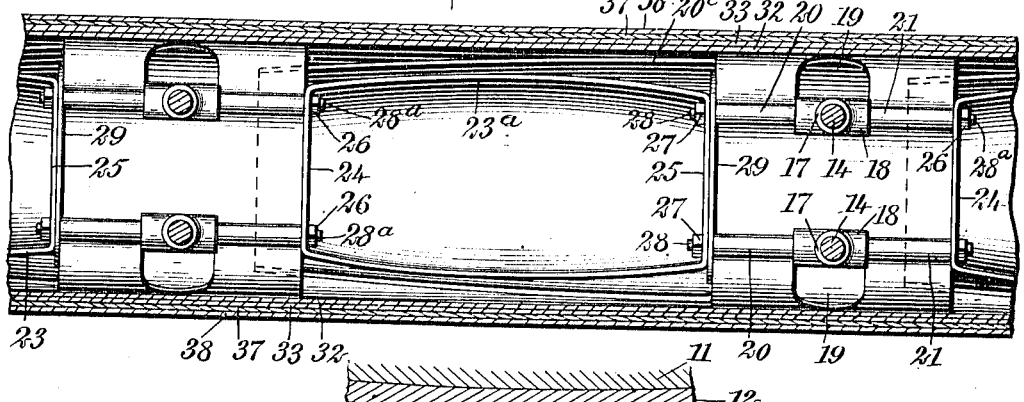
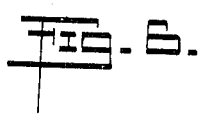
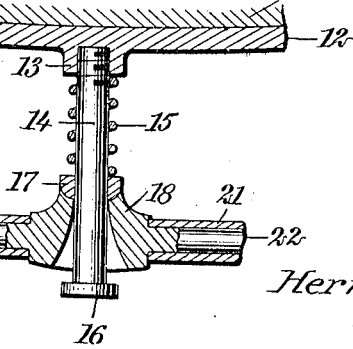
WITNESSES
INVENTOR
Herman B. Tobias
BY
ATTORNEYS

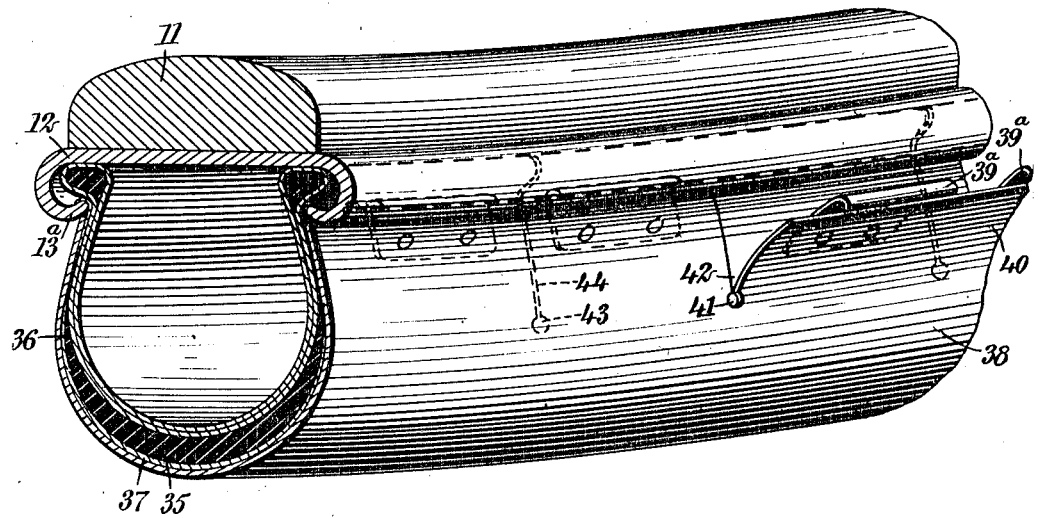
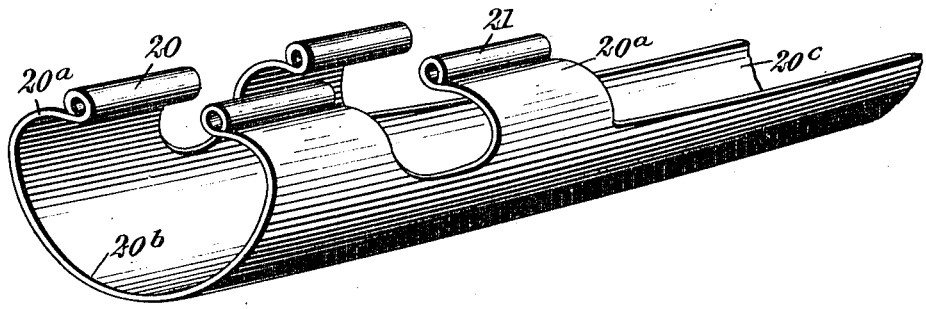

UNITED STATES PATENT OFFICE.

HERMAN B. TOBIAS, OF HOBOKEN, NEW JERSEY.

VEHICLE-TIRE.

954,361.  Specification of Letters Patent.  Patented Apr. 5, 1910.

Application filed May 15, 1908. Serial No. 433,019.

*To all whom it may concern:*

Be it known that I, HERMAN B. TOBIAS, a subject of the King of Roumania, and a resident of Hoboken, in the county of Hudson and State of New Jersey, have invented a new and Improved Vehicle-Tire, of which the following is a full, clear, and exact description.

My invention relates to vehicle tires, my more particular purpose being to provide a tire construction affording a maximum of elasticity and strength, coupled with simplicity and cheapness and offering a number of special advantages, as hereinafter described.

Reference is to be had to the accompanying drawings forming a part of this specification, in which similar characters of reference indicate corresponding parts in all the figures.

Figure 1 is a fragmentary side elevation showing a wheel equipped with my improved tire; Fig. 2 is an enlarged fragmentary section through a portion of the wheel rim and tire, this view showing the separate resilient cushions, means for holding the same in position, the cups for engaging the resilient cushions, and the mechanism connected with the cups and including springs serving to increase the resilience of the tire; Fig. 3 is a fragmentary cross section on the line 3—3 of Fig. 2, looking in the direction of the arrow, through the wheel rim and tire, this view showing the springs, and further showing the make-up of the tread of the tire; Fig. 4 is a view somewhat similar to Fig. 3, but taken on the line 4—4 of Fig. 2, looking in the direction of the arrow, and showing particularly the construction of the resilient cushions; Fig. 5 is a longitudinal section upon the line 5—5 of Fig. 2, looking in the direction of the arrow, and showing the cups and their mountings for holding the resilient cushions; Fig. 6 is a detail showing in enlarged section one of the guide pins and the spring encircling it for the purpose of increasing the resilience of the tire; Fig. 7 is a fragmentary perspective of a portion of the tire, showing how the outer covering is applied and held in position; and Fig. 8 is a fragmentary perspective of one of the overlapping plates which support the cups and press the latter against the resilient cushions.

At 9 is a hub and radiating from it are spokes 10 supporting a wooden rim 11. A metal rim 12 is mounted upon this wooden rim and is provided with lugs 13 of annular form spaced equidistant and integral with the metallic rim 12, and also with cupped edges 13$^a$, as shown in Figs. 1, 4 and 7. A number of guide pins 14 are screwed into the lugs 13 and thus secured rigidly in position. Each guide pin 14 is encircled by a spiral spring 15 and is provided with a head 16. Encircling each guide pin 14 is a ring 17 having its lower edge convexed, as indicated in Fig. 6. Each ring 17 engages a bearing 18, the upper surface of which is concaved in order to fit the ring 17. Each bearing 18 is disposed intermediate a pair of sleeves 20, 21, separated by a slot 19, as will be understood from Figs. 2 and 5.

The sleeves 20 and 21 encircle pins 22, which are integral with the bearings 18 and extend in opposite directions therefrom. A number of cups 23 provided with end walls 24, 25, parallel with each other, and also provided with side walls 23$^a$ slightly curved as indicated in Fig. 5, are disposed within the tire. The pins 22 are tension members, and considerable strain is at times thrown upon them. The pins are provided with threaded ends 28, 28$^a$ which extend through holes in the end walls 24 and 25, and are secured by nuts 26, 27. The pins 22 and cups 23 together form a continuous annular member. Guard plates 29 (see Fig. 3) are mounted upon the threaded ends 28 and project downwardly therefrom, as will be understood from Figs. 2 and 3.

At 30 are shown cushions of resilient material, preferably rubber and made hollow. These cushions are secured in position by aid of lugs 31 extending outwardly from the metallic rim 12. Two layers 32, 33 of fabric, preferably canvas, are made integral with each other and encircle two rings 34 of rubber or other resilient material, as will be understood from Figs. 3 and 4. A plate 35 of rubber or other resilient material is made thick at its middle portion and tapers off at its edges 36 to nothing. This plate partially encircles the outer layer 33 of fabric. A leather plate 37 is disposed outside of the plate 35 of resilient material. A jacket 38 of leather or other tough material forms the external member of the tire. Studs 39 are connected with this jacket 38 and with the plate 37. The plate 35 and the jacket 38 together constitute the tread.

A number of hooks 39$^a$ are mounted upon the leather plate 37 which, for the purpose, is provided with slots 42 whereby its inner portion is separated into tongues 40, each tongue carrying two hooks 39ª, as will be understood from Fig. 7, the tongues terminating in apertures 41. The rubber plate 35 and the leather plates 37, 38 are all cemented together at all points below the holes 41, so as to render the outer parts of the tire as nearly solid as practicable. The inner and outer layers 32, 33 of fabric are also provided with slots 44 terminating in holes 43. The sleeves 20 and tongues 20ª upon which they are supported (see Fig. 8) are integral with a body portion 20ᵇ, having a semi-cylindrical part 20ᶜ, all of these parts being integral and together forming a plate, a number of these plates overlapping each other, as will be understood from Fig. 2.

My invention is used as follows: The parts being assembled, whenever the weight of the vehicle rests upon the tire the studs 39 engage the ground and the weight is distributed to a great extent throughout various portions of the wheel. The pressure of the wooden rim 11 and metallic rim 12 downward forces the cushions 30 downward, and as these cushions rest in cups 23 the pressure is, of course, applied to these cups. Pressure is also transmitted to some extent from the metallic rim 12 through the spiral springs 15 to the bearings 18, and thence to the tongues 20ª. In case of an excessive load upon the vehicle, the guard plates 29 may sometimes engage the inner surface of the overlapping plates 12ᵇ, but in this event not much pressure is likely to rest upon these overlapping plates, and whatever weight does rest there is distributed as nearly equally as practicable. The overlapping of the plates 20ᵇ allows them a slight movement relatively to each other with the result that undue rigidity in the tire is avoided.

Having thus described my invention, I claim as new and desire to secure by Letters Patent:

In a device of the character described, the combination of a rim, cushions mounted thereupon, a composite member, having generally an annular form, encircling said rim and provided with portions engaging said cushions, a plurality of members arranged in a general annular form and connected to said composite member, said last-mentioned members overlapping one another, and a tread supported upon said last-mentioned members.

In testimony whereof I have signed my name to this specification in the presence of two subscribing witnesses.

HERMAN B. TOBIAS.

Witnesses:
 WALTON HARRISON,
 EVERARD B. MARSHALL.